United States Patent
Acernese et al.

(10) Patent No.: US 8,282,823 B2
(45) Date of Patent: Oct. 9, 2012

(54) LIGHTWEIGHT MODULAR WATER PURIFICATION SYSTEM WITH RECONFIGURABLE PUMP POWER OPTIONS

(75) Inventors: Primo L. Acernese, Allentown, PA (US); James Novak, Jr., Emmaus, PA (US); Joseph J. Totenbier, Allentown, PA (US)

(73) Assignee: TerraGroup Corporation, Allentown, PA (US)

( * ) Notice: Subject to any disclaimer, the term of this patent is extended or adjusted under 35 U.S.C. 154(b) by 295 days.

(21) Appl. No.: 12/717,611

(22) Filed: Mar. 4, 2010

(65) Prior Publication Data

US 2011/0215039 A1  Sep. 8, 2011

(51) Int. Cl.
*B01D 36/00* (2006.01)

(52) U.S. Cl. ........ 210/236; 210/238; 210/241; 210/258; 210/259; 210/416.3

(58) Field of Classification Search .................. 210/232, 210/236–239, 241, 258, 259, 261, 262, 416.1, 210/416.2, 416.3; 417/236, 359, 360, 374
See application file for complete search history.

(56) References Cited

U.S. PATENT DOCUMENTS

| | | | |
|---|---|---|---|
| 2,248,077 A * | 7/1941 | Harris | 210/255 |
| 3,257,956 A * | 6/1966 | Logue et al. | 415/197 |
| 3,910,728 A | 10/1975 | Sloan | |
| 4,515,533 A * | 5/1985 | Gomez | 417/319 |
| 4,836,921 A | 6/1989 | Hahn et al. | |
| 5,022,827 A | 6/1991 | Gargas | |
| 5,399,260 A * | 3/1995 | Eldredge et al. | 210/87 |
| 5,449,140 A | 9/1995 | Lastowski | |
| 5,529,462 A | 6/1996 | Hawes | |
| 5,788,858 A | 8/1998 | Acernese et al. | |
| 5,972,216 A | 10/1999 | Acernese et al. | |
| 5,980,220 A | 11/1999 | Mazzucato et al. | |
| 6,234,445 B1 | 5/2001 | Yoon | |
| 6,464,884 B1 * | 10/2002 | Gadgil | 210/748.11 |
| 6,596,174 B1 | 7/2003 | Marcus | |
| 6,616,833 B2 | 9/2003 | Lynch | |
| 6,922,981 B1 | 8/2005 | Tyree | |
| 6,936,176 B1 * | 8/2005 | Greene, III et al. | 210/702 |
| 7,063,783 B2 * | 6/2006 | Ballet et al. | 210/181 |
| 2004/0007402 A1 | 1/2004 | Kujawa | |
| 2005/0139530 A1 | 6/2005 | Heiss | |
| 2007/0080100 A1 | 4/2007 | Bowman | |
| 2008/0217256 A1 * | 9/2008 | Everton | 210/741 |
| 2008/0272040 A1 | 11/2008 | Norlund | |
| 2009/0045116 A1 | 2/2009 | Escribano | |
| 2010/0038292 A1 * | 2/2010 | Fike | 210/87 |

FOREIGN PATENT DOCUMENTS

WO  2005068377  7/2005

OTHER PUBLICATIONS

International Search Report and Written Opinion, PCT/US2011/025977, Oct. 31, 2011.

* cited by examiner

*Primary Examiner* — Matthew Savage
(74) *Attorney, Agent, or Firm* — Duane Morris LLP (57) ABSTRACT

A modular water purification system is optimized for versatility and weight using a pump component that is mountable by standardized fittings into alternative prime mover modules that can receive and power the pump. The pump can be a heavy high pressure pump for a reverse osmosis stage, interchangeably mounted on an internal combustion engine module or an electric motor module. The pump is enclosed and protected by a frame with end plates, elongated bar handles and a standardized base that fits into and is fixed by a sliding flange and clamping structure, locating the pump precisely to engage a rotational fitting on the pump shaft with a complementary fitting coupled to the prime mover.

16 Claims, 11 Drawing Sheets

LIGHTWEIGHT MODULAR WATER PURIFICATION SYSTEM WITH RECONFIGURABLE PUMP POWER OPTIONS

BACKGROUND

This disclosure concerns field-deployed water purification systems, especially for military use, disaster relief and other situations requiring a set of elements scaled for the particular application to be readily transported, set up and operated to produce purified potable water from unqualified sources. A configuration for such systems is disclosed wherein a demountable and re-mountable water pump is alternatively driven using a selected one of two or more alternative prime movers, such as a diesel engine or an electric motor, which prime movers are carried on respective different modular system elements. This configuration is beneficial for a system wherein the demountable pump is a heavy weight positive displacement high pressure pump that drives a reverse osmosis filtration unit.

As disclosed, for example, in U.S. Pat. Nos. 5,972,216 and 5,788,858, which are hereby incorporated by reference, it is known to deploy a modular water purification system having pump elements, filter elements, storage tanks and the like. The modular elements can be wholly or partly mounted on trucks or trailers, or can be discrete units that are carried as cargo to a site where needed to product potable water. Potable water might be obtained by purifying water from any of various sources, such as water from a natural watercourse such as a creek or river. Sea water is a source from which water can be desalinated by appropriate filtration techniques. Water also may be extracted and purified from sources that might have been considered acceptable but are contaminated or might be contaminated such as flooded municipal water supplies or swimming pools. Water also might be filtered because it originates in a source that might be exposed introduction of foreign materials such as pathogens by an attacker.

Water treatment in such situations comprises plural filtration steps. Solid material such as entrained silt and algae is separated by screening, settling, centrifugal motion, etc. Chemical fractions that may be in solution or entrained are absorbed, for example by chemical reaction producing a precipitate that is separated out or by exposure to a reactive surface at which the chemical fraction is immobilized. Water may be subjected to ion release materials such as copper, silver and other biocidal materials. The water can be passed through a reverse osmosis filter stage to remove ions, microbes and particles down to a very small size. The final product is chlorinated and may be dispensed or stored, for example in tanks or inflatable bladders from which the purified and chlorinated water is dispensed. Advantageously, these different filtration and treatment steps are accomplished by pumping water obtained from a source, through successive treatment steps that are accomplished at modular pumping filtration, treatment and storage modules.

The modules can be stages of processing in a self contained water treatment system, but a more versatile and readily serviceable system is provided by a system wherein the stages are substantially separated into discrete modular parts that can be used or not used when required, and coupled in different configurations for different purposes. For example, to serve capacity requirements, it may be necessary to provide conduits, pumps and filtration media defining parallel flowpaths to multiply the flow capacity that would be available with single flowpath. Different configurations and filtration steps may be appropriate for different needs. For example, treating muddy fresh water may require separation of particulates more than other steps. Treating clear sea water may require desalination more than particular separation. It is useful to provide modules with connections enabling different deployments and configurations.

Filtration media may be disposed in filter cartridges that are useful for some nominal flow volume that is a function of the characteristics of the raw water being treated, after which the cartridges need to be replaced. To accommodate different flow arrangements and to enable the elements at respective operating stages to be switched in and out, arranged in alternative flowpaths and generally configured for needs at the time, the above-cited U.S. Pat. Nos. 5,972,216 and 5,788,858 provide for modular arrangements wherein operating elements such as pumps, separators, tanks and filters are connected on site according to alternative operational requirements.

Filtration systems that employ reverse osmosis water purification elements, for example for desalination, have pumping pressure requirements that are generally higher than might be required simply to move water from a raw water source through a separator and into a tank. Initial raw water collection, solids screening and passing of the water through filtration media are done at relatively low water pressure. A pump that moves water through a reverse osmosis filter stage needs to apply a pressure differential across the reverse osmosis membrane that is sufficient to overcome the tendency of water to diffuse through the membrane toward the side with a greater ion density. For desalination, the pressure differential enables pure water to diffuse to the low pressure side, leaving the higher salinity brine behind on the high pressure side, to be flushed away. Assuming that a given flow rate is obtained by providing a predetermined membrane surface area, the flow rate can be increased by adding reverse osmosis filter stages in parallel.

The various alternative configurations are such that quick connect couplings are advantageous. Multiple pump modules that respectively operate at high or low pressure need to be available. High and low pressure conduits and fittings need to be organized. Appropriate manifolds and various valves are useful for switching and flowpath diversion as needed.

Field deployed potable water sources are more efficient than transporting purified water to a site of need whenever the need for water exceeds a short time. Field water purification units are useful for military force deployment, disaster relief and other situations in which a temporary need arises and municipal sources are not available. Water treatment facilities may be carried on trucks or trailers and used to fill tanks carried on trucks or trailers, but so long as the facilities are needed at a certain location, mobility is not a requirement. Field deployment can be provided using modular elements packaged to be transported to a site and dropped off. The modular elements are sized to weight specifications enabling manipulation of the elements by a few soldiers or other workers. For example, if an assembled set of water treatment modules are dropped near a raw water source, and no single module weighs more than about 200 lbs. (about hundred kilograms), two soldiers working together can configure a water treatment plant on the same day, producing potable water sufficient to serve a company of soldiers.

A water treatment system divided into relatively small elements has the potential benefit that each discrete element can be made light in weight and is easier to handle or requires fewer people than a heavier element. If there are numerous modules that can be mixed and matched and coupled in different ways, the water treatment system may be more versatile, but configuring and connecting the modular parts is complex. It would be beneficial to maximize versatility, minimize individual module weight and to make the configuration and connection of an operable system uncomplicated.

The present disclosure addresses the nature and configuration of power sources used to operate the water purification system, i.e., the water pumps. Suction and pressure lines are required to draw in raw water, to establish a pressure differential across filter media, and to provide a head of pressure and/or to lift the elevation of water to be dispensed. The necessary pumps can be driven by electric motors if there is a source of electric power, which is advantageously quiet. Pumps can be driven directly by internal combustion engines. Pumps can be driven by electric motors that are powered from a generator driven from an internal combustion engine. These and other configurations are possible.

For military applications, an internal combustion engine may be desirable so as to operate independently, but an electric motor is lighter, quieter and relatively maintenance free if a source of electric power is available. Some military vehicles provide for electric power take off from a generator coupled to the vehicle power plant. It is an aspect of the present disclosure to provide the capability of using either or both of electric motors and internal combustion engines in a modular water purification system, and to do so in a way that minimizes the weight of the modular components while at the same time reducing the complexity required to couple and decouple certain water pumps.

SUMMARY

It is an object of the present disclosure to provide an optimized arrangement with respect to versatility and function in a configuration of light weight modules, by arranging for one or more pump components, especially the heavy high pressure pump of a reverse osmosis water purification stage, to be interchangeably mounted in alternative prime mover modules having pump docking stations. A docking structure is provided on the pump. Each of the prime mover modules that may be employed has a complementary docking structure that receives the docking structure of the pump. When the pump is docked, the driven shaft of the pump is arranged by the docking structures to engage the driving shaft of the prime mover module, such as an internal combustion engine module providing mechanical power independently, an electric motor module providing mechanical power in conjunction with a generator or an available hookup to utility mains, a hydraulic pump or the like. The necessary mechanical connection of the pump to the source of torque is provided simply by inserting the pump housing into the docking station and clamping the pump housing in a docked position.

In embodying the arrangements described, a standardized base panel is provided on each of the alternative prime mover modules, in each case carrying the prime mover motor/engine and the docking station that locates the pump to engage precisely with the prime mover. Axially engageable rotational shaft couplings can be used for this purpose. The shaft coupler can comprise non-round male and female structures that engage and disengage axially and when engaged become rotationally fixed to one another. An example is a jaw coupler having circumferentially-spaced axially-extending fingers that interleave with one another and a vibration cushioning spider. Another example has axially protruding radially spaced fingers on a coupler on one shaft that fit into complementary finger sockets in the coupler on the other shaft.

The pump housing is preferably mounted in an assembly that forms a unitary chassis, in particular a cage attached around the pump housing between end plates that are affixed to one another and to the pump housing at the base plate and provide elongated bars that are useful as handles when manually placing and attaching the pump in position to engage the prime mover. Placing and attaching the pump involves sliding a shoe part of the pump assembly into a receiving slide on the base panel of the prime mover module, and clamping the shoe against the base panel by tightening down bolts on the receiving slide.

More particularly, a water purification system is provided with multiple functional modules that are connectable by water flow conduits, one or more including a water filtration element and one or more including a water pump. The water flow pump is detachable and demountable from drive units to which the pump can be coupled selectively, for example with one or more drive units being provided with an electric motor prime mover and another of the drive unites having an internal combustion engine. The system is configured for convenient re-mounting of the pump to a different one of the modules, of the same or different type of drive unit, to which the pump can be coupled. The electric motor and internal combustion engines preferably have their own modules, either or both of which may be available in a given deployment of the water purification system, and to which the respective electric motor or internal combustion engine or other prime mover such as a hydraulic drive unit can be coupled. The pump is mounted upon and driven by either of the module prime movers as the power source.

The multiple functional elements can be configured such that individual modules are limited to particular functions. In addition to the modules providing mechanical power in the form of torque to the pump shaft, the modules can include a solids separation module, one or more additional modules that might or might not have detachable aspects but likewise pump water, tanks or bladders for collection of raw or treated water, media filter elements and chlorinators. Advantageously, the system includes a reverse osmosis filter stage and the demountable pump comprising a high pressure pump that develops a sufficient pressure head for water purification in demanding applications such as desalination of sea water. Tanks, storage bladders, intake elements and output nozzles are included and preferably the entire system is packages as a set of framed modular elements that can be stacked together with one another and optionally a container of hoses, tools and supplies, so as to be readily dropped off on site and manipulated there using the elements provided, to supply potable water.

The water purification system modules preferably include at least one filtration module and at least two pump driving modules. At least one of the pump driving is used at any given time to drive a pump that is detachably mountable in the pump driving module, and likewise interchangeably can be demounted and reinstalled interchangeably in a different one of the pump driving modules. The supplied system also may be provided with one or more additional demountable pumps, making it possible when desirable to mount and run pumps in both pump drive modules using plural pumps. Inasmuch as pumps according to a standardized configuration can be interchangeably driven by prime mover modules that respectively may include an electric motor, an internal combustion engine, another power source or actuator, or a combination, the system can be driven independently or from an electric power source such as a utility power mains or a generator as another module or as an electric power take off from a vehicle power supply such as an on-board generator on a military vehicle. Alternatively or in addition to switching a pump to the most desirable one of plural available prime movers, additional pumps can be coupled to increase capacity, and any combination of pumps and prime movers can be employed.

Preferably, two pump driving modules are made available (although both might not always need to be deployed at a given site). The available modules include alternative prime mover modules, preferably the module carrying the electric motor and the module carrying the internal combustion engine. Each such pump driving module comprises a permanently installed prime mover (one of the motor or engine), with a detachable demountable fixture that can receive the water pump, enabling the pump to be swapped between and interchangeably to be driven by one of the motor and the engine (or interchangeably swapped between two modules both having electric motors or two modules both having internal combustion engines). All that is necessary is to install the pump using its standardized detachable mounting, by placing and affixing it in the complementary receiving structure of the module carrying the respective one of the motor and engine.

The modules are particularly useful in connection with modular water purification systems having one or more filtration elements with reverse osmosis filter membranes. In that case, a high pressure pump is needed to develop operational pressure for maintaining a flow through the membrane. A positive displacement high pressure pump of suitable capacity can be heavy, e.g., 160 lbs. A prime mover such as an internal combustion engine or electric motor of five or ten horsepower is also relatively heavy, e.g., 200 lbs. If permanently married in a pump module including a pump and motor/engine, the pump module would tax the ability of two persons to move and deploy it. By providing a detachable and re-mountable high pressure pump, not only is the module weight reduced to a more manageable level, but the versatility of the system is substantially improved.

The pump is arranged as an assembly with a cage or chassis that encloses around and protects the pump. The pump assembly is a unitary structure enabling the pump to be manipulated into and out of the prime mover module. In one embodiment, the pump assembly comprises the pump housing, end plates that are bolted to the pump housing and extend from the pump housing, bars that serve as handles and extend between the end plate, and a sliding shoe attached to the pump housing. The sliding shoe is disposed under the pump housing and has lateral flanges that mate with a slide fixture of the pump driving module carrying the prior mover. The end plates and chassis protect the pump housing, afford for manual manipulation, standardize the mounting structure, and dissipate heat that may be generated by operation of the pump. The sliding shoe is received in the slide fixture of the driving module and affixed in place by clamps engaging against the lateral flanges of the sliding shoe.

The pump assembly and pump driving prime mover rest on a base panel on the pump driving module when mounted. The slide shoe of the pump assembly slides in a direction parallel to the pump shaft axis, into a guiding receptacle affixed to the base panel. The guiding receptacle can have spaced flanges shaped to overlap the lateral edges or flanges of the slide shoe. The clamp structure mechanically fixes the slide shoe to the base panel at an axially advanced position at which the shaft couplings of the pump and the engine or motor become operatively engaged. The end position can be set using locating pins or detents or in the embodiment shown in the drawings, by an end block. In the exemplary embodiment, the spaced flanges on the base panel can be clamped down on the shoe, but it is also possible to provide an arrangement wherein other particular provisions, such as the opposite gender relationship is used for the clamped and clamping parts, or the shoe could be bolted directly to the base panel.

A number of additional objects and aspects of the system will be seen from the following discussion of specific exemplary arrangements that are advantageous for reasons that are explained or will become apparent.

BRIEF DESCRIPTION

The description and drawings demonstrate certain examples in connection disclosure of general aspects and also specific embodiments. The subject matter should not be regarded as limited to the alternatives and embodiments used as examples. Instead, reference should be made to the appended claims to assess the scope of the subject matter. In the drawings.

DETAILED DESCRIPTION

Figure 1:
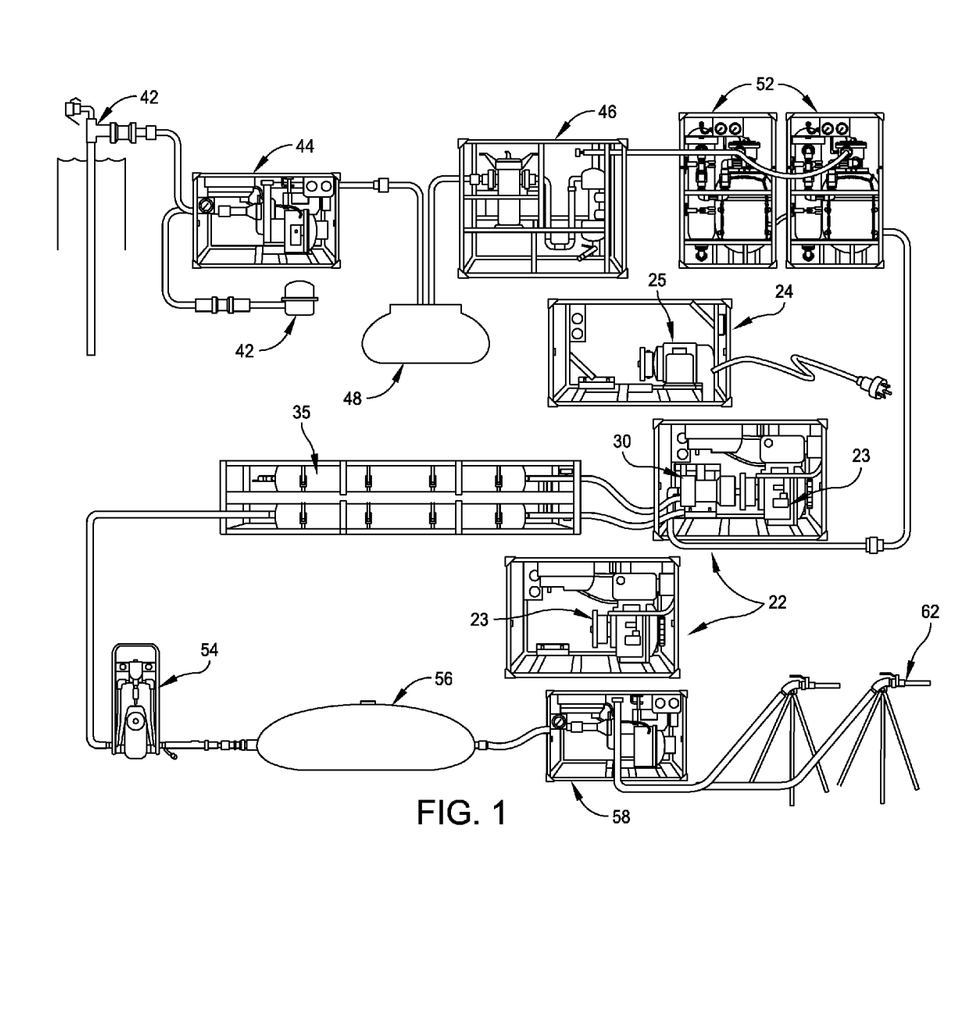
FIG. 1 is a schematic illustration of a water treatment system according to one embodiment, having an electric motor drive unit and an internal combustion engine drive unit, either of which can alternatively receive a pump.

FIG. 1 shows a water purification system according to an exemplary embodiment having plural functional modules connectable by water flow conduits, the modules carrying at least one water filtration element, and at least one water pump coupled by the conduits to the water filtration element. One of the water pumps, namely high pressure pump 30 is configured in this embodiment to permit coupling of the water pump 30 to a selected one of at least two alternative drive units 22, 24 exemplified in the depicted example by a drive unit 24 with an electric motor 25 and one or more internal combustion engine drive units 22 with internal combustion engines 23.

The prime movers of the drive units, namely the electric motor 25 and the internal combustion engine 23, are permanently mounted in the frame structures that are structured to support the respective drive unit. Thus, for example, the internal combustion engine drive unit 22 can have a diesel engine 23 and those conveniences or necessities that are applicable to a diesel engine such as a fuel tank, a battery and heater, etc. Likewise, the electric motor drive unit 24 includes in addition to the electric motor 25, the necessary connections for coupling the motor to a source of electric power and may have switches and circuit breakers to facilitate connection. In the embodiment shown, the electric motor is shown for purposes of illustration of an exemplary connection, with a standardized AC plug that might be used for connecting to an electric utility system or to a generator (not shown).

Figure 2:
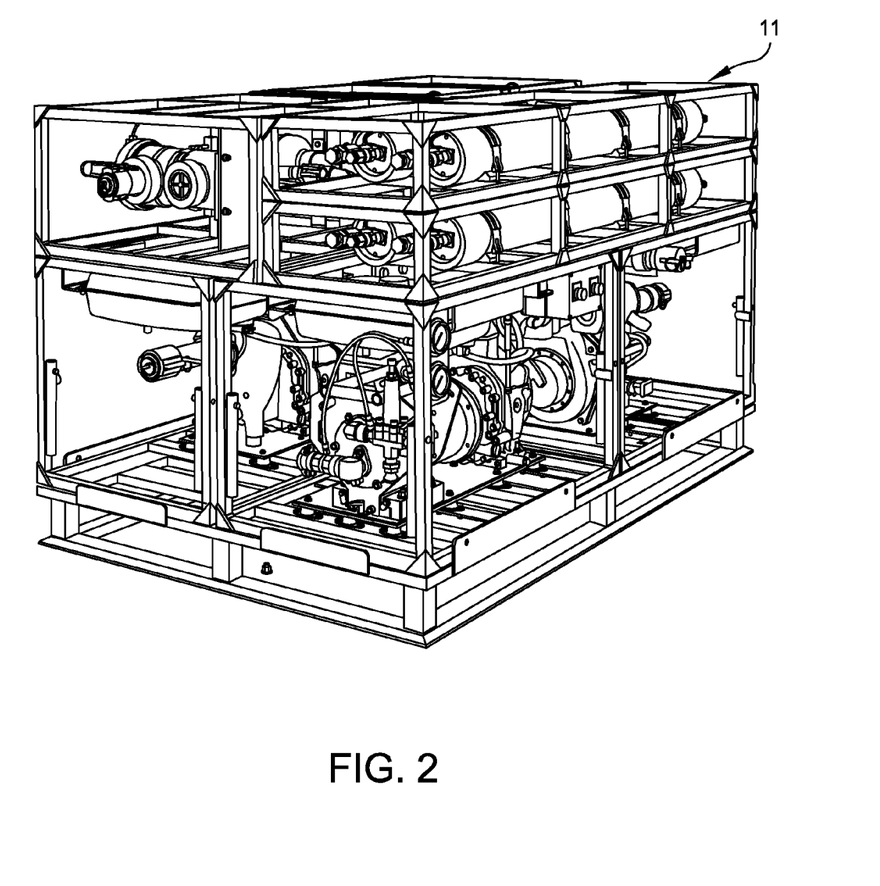
FIG. 2 is a perspective view showing the water treatment system with modules that are sized to stack into a regular rectangular shape transport as a palletized load.

Preferably the respective module frame are parts of a unit 11 that can be stacked into a palletized package as shown in FIG. 2, wherein each frame occupies a segment of a regular volume capable of being strapped as a unit for convenient shipping, manipulation by fork truck or other load device, deployment via air drop or other appropriate handling.

An aspect of the system is that at least one available water pump 30 is alternatively coupled to a selected one of two or more drive units 22, 24 that are both configured to receive the pump 30 interchangeably, instead of having the pump installed as a permanent element in the drive unit. In order to facilitate this aspect, the water pump 30 is part of an assembly that is configured for manual handling, namely for removing the water pump from one drive unit and installing the water pump in another drive unit that may be of the same or different prime mover type. Parts of the pump assembly are shown separately in FIG. 3 and assembled with the pump housing in FIG. 4.

Figure 3:
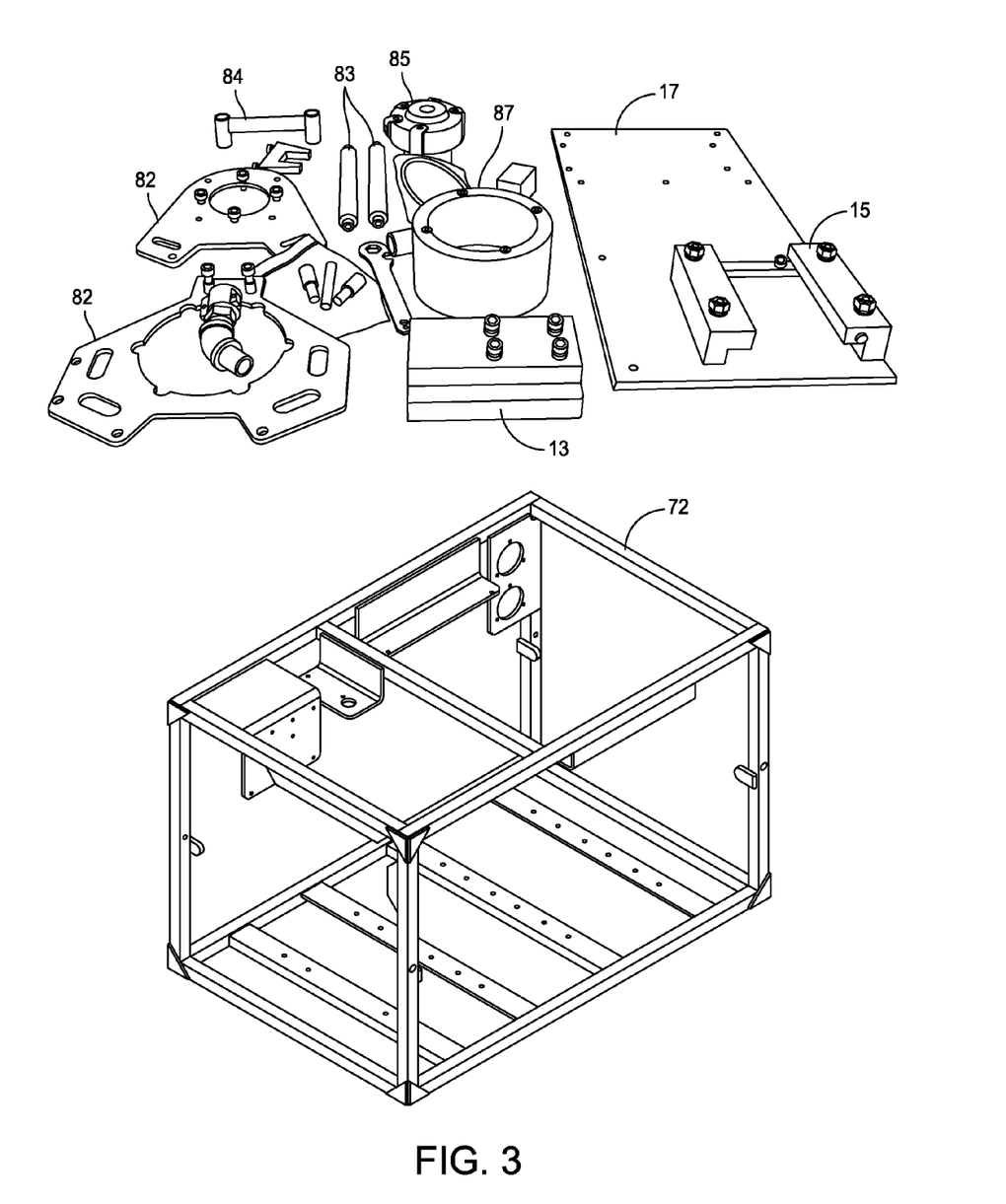
FIG. 3, is an exploded view showing mounting and coupling fixtures that are coupled to the pump housing for mounting the pump in a selected one of the drive units.
Figure 4:
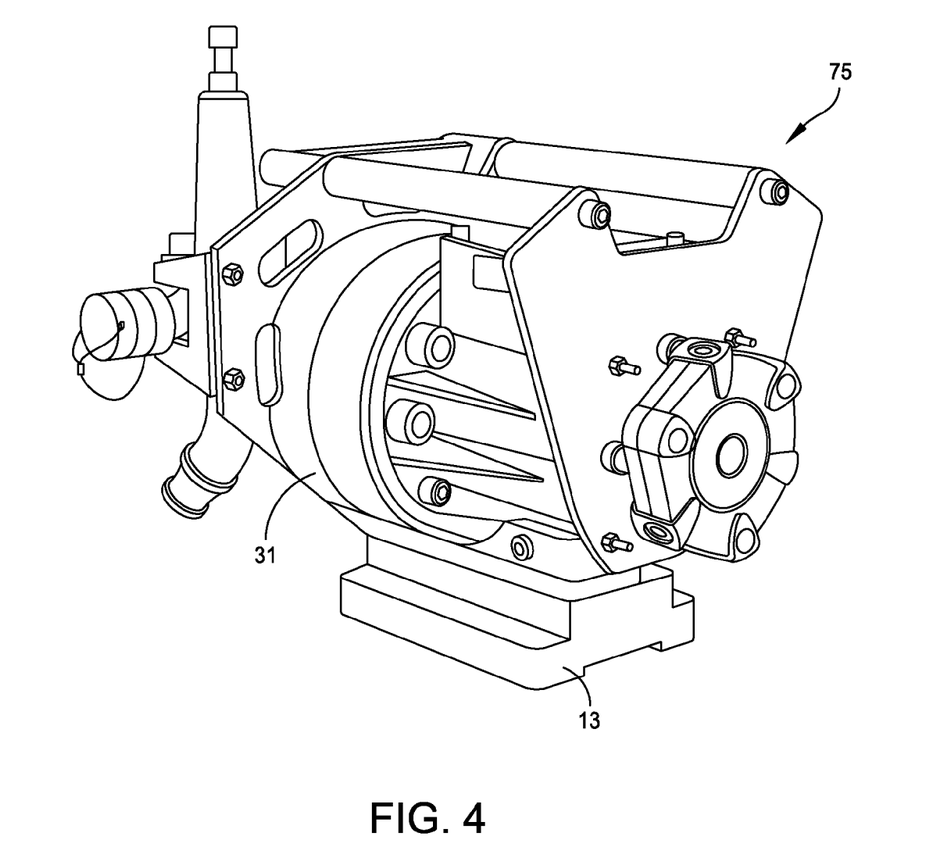
FIG. 4 is a perspective view showing a pump assembly from one end, as configured for removable mounting in the selected drive unit.

The pump assembly has a shoe 13 to which the pump housing 31 is bolted or otherwise attached. The shoe 13 forms a base for the pump assembly, with laterally protruding flanges that fit into a slide 15 on a base panel 17 provided in the drive units. The slide on the base panel 17 can be formed by parallel angle bars forming a right angle in cross section. Preferably the slide 15 is formed by continuous bars as shown, leading up to an end stop 19 in the axial direction, but could comprise a set of separate spaced hold-downs. The angle bars in the embodiment shown are parallel and spaced apart, and provide free edges 16 that are located at a standoff space above the surface of the base panel 17 sufficient, when not bolted down tightly, to admit and rest over the lateral edges of the shoe 13. The angle bars form a locating slide and overlie the edges of the shoe 13 so that when the angle bars are bolted tightly down against the mounting panel 17, the pump assembly is securely and rigidly affixed on the base panel 17 in proper position, by clamping of the base shoe against the mounting panel by the bolted down angle bars. The stop 19 that defines the point of maximum advance into the slide provided on the mounting panel between the parallel bars at which the shaft couplings of the prime mover drive shaft and the driven pump shaft are operationally engaged.

The prime mover, such as a diesel internal combustion engine, an electric motor, a hydraulic motor or the like, is also fixed relative to the mounting plate 17 and has a drive shaft with the coupling positioned to engage a complementary coupling on the pump shaft. Thus the water pump can be installed on and driven by different power supplying frame units as appropriate for a given situation. The unused alternative prime mover power units, without a currently installed pump, are not as heavy as comparable units with permanently installed pumps. Swapping the pump from one prime mover to another and making the necessary water line connections is less complicated than bringing in a whole new pump unit that is permanently installed on a prime mover frame, and then making the water line connections needed.

FIG. 1 schematically illustrates a deployed water purification system, equipped as detailed herein with alternative power supplying frame units 22 driven by internal combustion engines 23, and a power supplying frame unit 24 driven by an electric motor 25. The associated water pump 30 is shown installed on one of the available internal combustion units 22, but is readily removable from that unit for alternative installation in the electrically driven unit 24 or in another similar internal combustion unit 22.

Advantageously, the water pump 30 that is alternatively driven by one or another of the power units 22, 24, is the high pressure water pump that is coupled to a reverse osmosis filter element 35. The respective elements of the water purification system include one or more inlet devices 42 coupled to a low pressure pump 44 that feeds raw water to a solids separator 46, optionally by way of a raw water storage tank or bladder 48. Removed solids are flushed away. The water is passed through one or more filtration units that carry cartridges containing filter media to which the water is exposed in known manner.

The water is then coupled through the high pressure pump 30 to the reverse osmosis filter 35. A sufficient head or differential pressure is needed on the membrane to oppose the osmotic pressure that would normally cause the water to diffuse toward the side with greater ion concentration, e.g., greater salinity. The high pressure pump operates to maintain sufficient pressure to oppose osmotic pressure and cause water to diffuse through the membrane toward the low ion concentration side, leaving ions behind on the so-called brine side. The high pressure pump also provides pressure and flow to force the progressively more brine-concentrated water on the brine side along a flow path through the filter element, with the salinity or other ion concentration becoming progressively higher, until the brine side water is discharged, e.g., flushed away or returned to the raw water source. The filtered output of the reverse osmosis filter is optionally chlorinated at chlorination unit 54 and stored in a potable water tank or bladder 56. An optionally low pressure output pump 58 delivers that water via discharge valves 62 and the purified water flows out through associated distribution nozzles or other fixtures.

A water purification system as described has multiple elements such as one or more pumps and one or more filters that need to be coupled to one another to draw water from a source, to force water through a filter, to pump purified water into a tank, etc. Depending on the situation, a reverse osmosis filter may be advantageous, for example for desalination. More or less flow volume may be needed per unit of time. Although the elements of a filter installation could be permanently configured and mounted on a truck or trailer to form a self contained unit, it is advantageous to arrange the system as a number of functional modules that can be coupled in selected configurations. In the embodiment shown, plural osmosis membrane vessels are mounted in an array on a partially enclosing frame and have fittings or manifolds at the ends for coupling the devices and/or their filtered water or brine flowpaths in parallel or series. It is also advantageous at times to stack two or more such membrane racks and likewise to make the necessary parallel and serial connections of the reverse osmosis membrane vessel and/or frames or racks of elements.

The combination of functional elements that is appropriate to a particular deployment can be laid out and interconnected to achieve the pressure and flow conditions that produce required pressure and flow conditions. For example, if additional flow capacity is needed, elements such as the reverse osmosis filter elements on one or more of the frames or racks can be arranged in parallel flow configurations, or re-arranged from serial to parallel flow configurations. If there are considerations as to the distance or elevation between source and users, elements can be arranged at corresponding distances and connected by serially disposed pumps. Various configuration changes are readily made. The modular arrangement makes the system versatile.

The water pump modules used to produce pressure or suction each require a water pump driven by a prime mover such as an internal combustion engine 23, e.g., burning gasoline or other fuel, or an electric or hydraulic motor 25 coupled to a corresponding power source. Conventionally, the prime mover engine or motor is permanently mounted on the same module as the pump and is mechanically coupled to the pump such that power exerted by the prime mover, especially torque to rotate a drive shaft, is coupled to the pump and moves the water. Conventionally, the fluid lines that couple between functional modules can be arranged in different ways but the pump modules have permanently married pumps coupled to motors or engines.

In the embodiment shown in FIG. 1, the respective modules include a separator module 46, two filtration modules 52 for ion exchange, separation of volatiles and the like, a reverse osmosis frame rack with several osmosis membrane vessel, and plural pump modules 44, 22 or 24 and 58 that move the water along. Although the operative pump modules each require a prime mover source of mechanical power and a pump that applies the power to induce pressure and/or flow in the water, according to the disclosed embodiments, at least one of the pump modules 22 or 24 is configured such that the pump assembly of the pump module is readily removable and can be installed readily on an alternative pump module having the same or a different type of prime mover.

According to one aspect, at least two pump modules are provided on frames and can be used interchangeably. One module 24 includes an electric motor prime mover 25. Another module 22 (two of which are shown) includes an internal combustion engine 23. Each of the electric motor carrying module 24 and the internal combustion engine module(s) 22 comprise docking structures, explained in detail below, at which a pump 30 of a standardized assembly configuration can be received and operatively coupled to the prime mover.

At least two modules with alternative prime movers (such as electric motor modules, internal combustion engine modules, and/or combinations of different module types) each comprises a permanent mounting on the respective frame of a module, for a respective one of said motor and engine. The motor or engine presents a detachable shaft coupling for the pump. The module construction comprises a docking arrangement whereby the pump can be received interchangeably and fits in to engage the shaft coupling between the motor or engine and the pump, by rigidly fixing the pump assembly in operative position on the module. The pump is alternatively and interchangeably driven by one of the motor and the engine by installing the pump in the detachable mounting of the module carrying the respective one of said motor and engine.

Advantageously, the invention is applied to a pump module that develops sufficient pressure to force water through a membrane of a reverse osmosis filter 35 in opposition to the inherent tendency of water to diffuse in the other direction, and the pump comprises a high pressure pump developing an operational pressure for maintaining a flow through the membrane. A rather large and heavy high pressure pump is needed to be capable of developing high pressure, possibly 1,000 lbs/in$^2$ (PSI), for desalinating a sea water source using a reverse osmosis filter stage, and operating with sufficient capacity to serve potable water for a moderate contingent of personnel, such as 20 gallons per day for each member of a company of 150 to 200 soldiers. In one embodiment, the pump can be a Wanner Engineering Hydra-Cell positive displacement pump model D/G-10E, operable at 1,750 RPM to pump 8.0 gal./min., weight approx. The pump weighs about 66 lbs.

A water purification system according to the embodiment shown, if configured for a company of soldiers as described, could require a five to ten horsepower (HP) prime mover. A suitable electric motor is the Baldor CP 3770T (equivalent to Siemens ESH6415), which is a 7.5 horsepower (5.5 KW), three phase motor nominally operable at 1,765 RPM on 60 Hz power. That motor is specified to weigh 166 pounds. The engine is preferably between five and ten horsepower. An exemplary gasoline engine of 7.5 HP is the Briggs & Stratton Vanguard Horizontal Engine Model#138432-0035. An exemplary diesel engine is the Yanmar model L70 V 5.8 HP (4.3 KW). Other models and other types of prime movers of similar power output are also applicable.

The prime movers that interchangeably receive the pump are permanently mounted to their respective module frames in a position to locate the drive shaft of the prime mover (motor or engine) coaxially with the shaft of the pump and to engage their shafts when the pump assembly is mounted in the frame by fitting the base shoe 13 of the pump assembly into the slide receptacle on the base panel and clamping down bars 16 (see, e.g., FIG. 5). The drive shaft of the permanently mounted prime mover and the shaft of the pump carry complementary shaft couplings, shown in FIG. 10, whereby the prime mover is mechanically coupled to turn the pump shaft. Preferably, the prime mover shaft and the pump shaft are directly coupled using coaxial axially-engageable non-round structures that are movable together or apart in the axial direction, and engage rotationally when axially fit together or disengage when axially separated. It is also possible to couple the couple the shafts through a drive train with additional couplings and elements between the prime mover shaft and the driven shaft of the pump. For example, a gear reduction unit (shown in FIG. 10) can be disposed in the drive train between the drive shaft and the pump shaft, in which case the pump shaft is located coaxially with the output of the gear reduction unit.

A suitable shaft coupling that is readily fitted by moving the pump along a line parallel to the pump shaft is the jaw type coupler, which has pin or jaw members on one coupling part, spaced from the rotation axis, and extending parallel to the rotation axis to fit into corresponding openings in a complementary coupling part. An example is a jaw type rotational coupler, such as available from Lovejoy Inc. which has a male disc coupled to one shaft, with axial pins spaced from the rotation axis. The pins are fittable into corresponding openings in an opposed female disc coupled to the other shaft, arranged coaxially with the first shaft. A suitable coupler is a Series LJ Lovejoy torsional coupler. In any case, the shaft coupling is engaged and disengaged by manual displacement of the pump assembly along a longitudinal axis. When engaged, the coupled transfers torque from the prime mover to the pump.

In a preferred arrangement, a torsional coupler has a disc for one shaft with three fingers arranged at 120 degree intervals, radially spaced from the axis, that fit into three corresponding holes in a coupling disc for the second shaft. The coupling disc for the second shaft can comprise a stiff elastomer defining the three holes, thereby providing a rotational attachment with some degree of cushioning. The coupling can be located within a protective collar that prevents external items from coming into contact with the coupling or shafts.

According to an aspect of the disclosed embodiments, a base mounting structure is provided for removably and interchangeably mounting the pump to either the module carrying the motor or the module carrying the engine (or alternatively to another prime mover module that is similarly equipped). For this purpose, the base mounting comprises complementary structures affixed to the housing of the pump and to the frame structure of the prime mover module. These structures are configured to allow the pump housing to slide into and dock on the frame structure in a position at which the shaft couplings on the pump shaft and the motor or engine shaft fit together axially and become rotationally affixed so as to transfer torque from the motor or engine to the pump. Likewise, the docking arrangement permits the pump to be extracted and decoupled by withdrawing the pump in a direction parallel to the pump and motor shaft axes.

Reference can be made to FIGS. 3 through 8 for aspects of the docking arrangements, which are provided on each of the alternative prime mover modules, and enable the pump housing to be mounted interchangeably for driving by alternative prime mover modules 22, 24. The prime mover modules each comprise a frame 72 preferably of welded bars, for example of angle iron, stainless steel and/or rectangular aluminum tubing. A mounting panel or base plate panel 17 shown separately from the frame on the right side of FIG. 3 is attached to the frame 72 by bolts, preferably with vibration-damping resilient pads 73 disposed between the frame 72 and the base panel 17. (See FIGS. 6 and 8.) The base panel 17 can comprise a ⅜ inch thick aluminum or stainless steel plate with mounting holes or similar provisions for mounting a prime mover such as an internal combustion engine 23 or other prime mover at a predetermined position on the same base panel 17. The assembly including the pump housing 31 likewise is mounted on the base panel 17 in a complementary position by virtue of the sliding receptacle for the pump assembly, engaging with the prime mover to operate the pump.

Figure 5A:
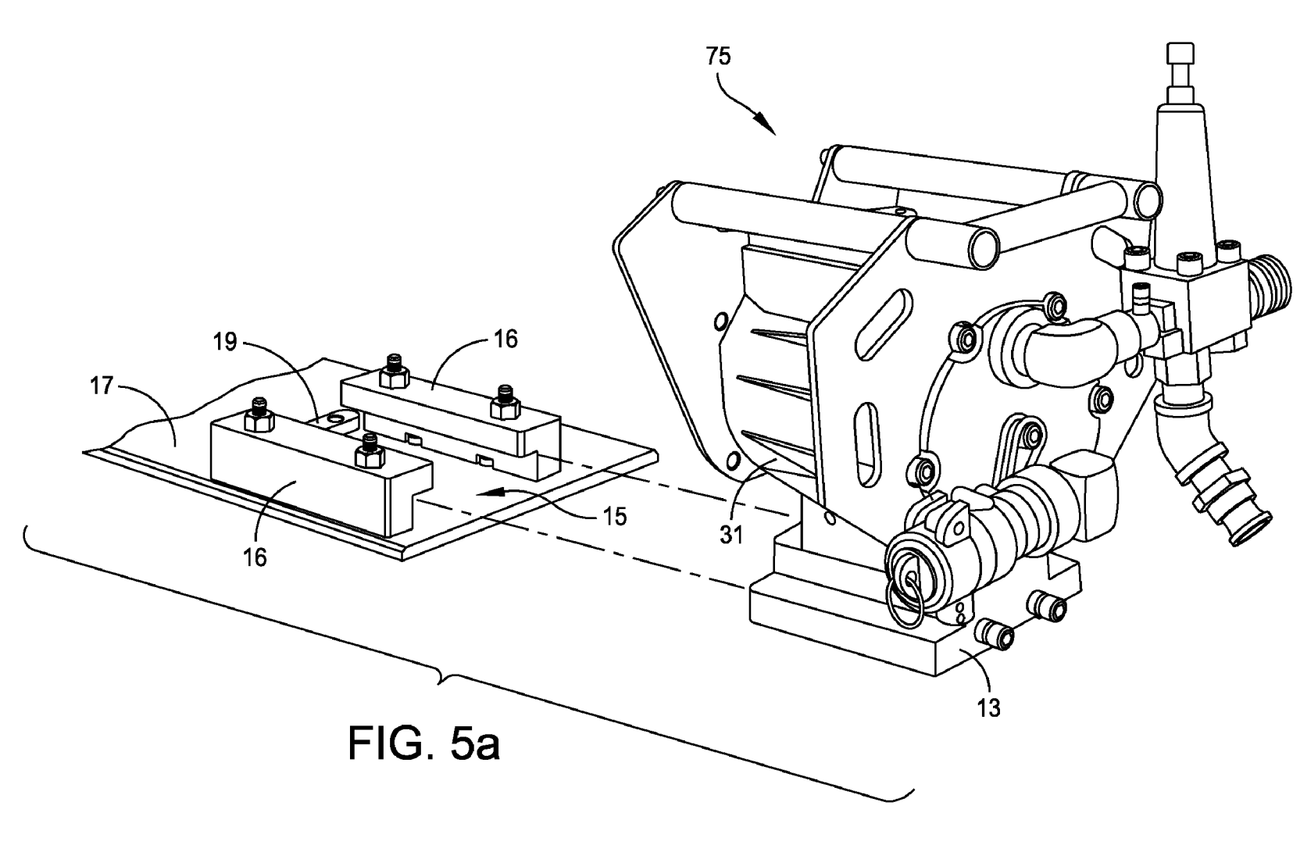
FIGS. 5a through 5d are perspective views showing the pump assembly from the other end, and including schematic illustrations showing how the pump assembly interacts with the receiving structure mounted on a base panel of the drive unit.

In FIG. 3, the parts other than the pump and the engine or motor are shown disassembled. The base plate 17 having the clamping slide 15 is to be mounted in the frame 72, which as shown has pivotable carrying handles at each end. The pump assembly 75 as fully assembled including the pump housing 31 is shown in FIG. 4 from the end having the shaft coupling. FIG. 5a shows the pump housing assembly from the opposite end at which fluid connections with the pump are made, and schematically illustrates docking of the pump housing assembly 75 on the base panel 17, namely by moving the pump assembly in the direction shown such that the flanges of shoe pad 13 are received under the clamping flanges 16. The shoe 13 is moved up to the stop 19 and the bolts on clamping flanges 16 are tightened down to lock the pump assembly in position.

Figure 5B:
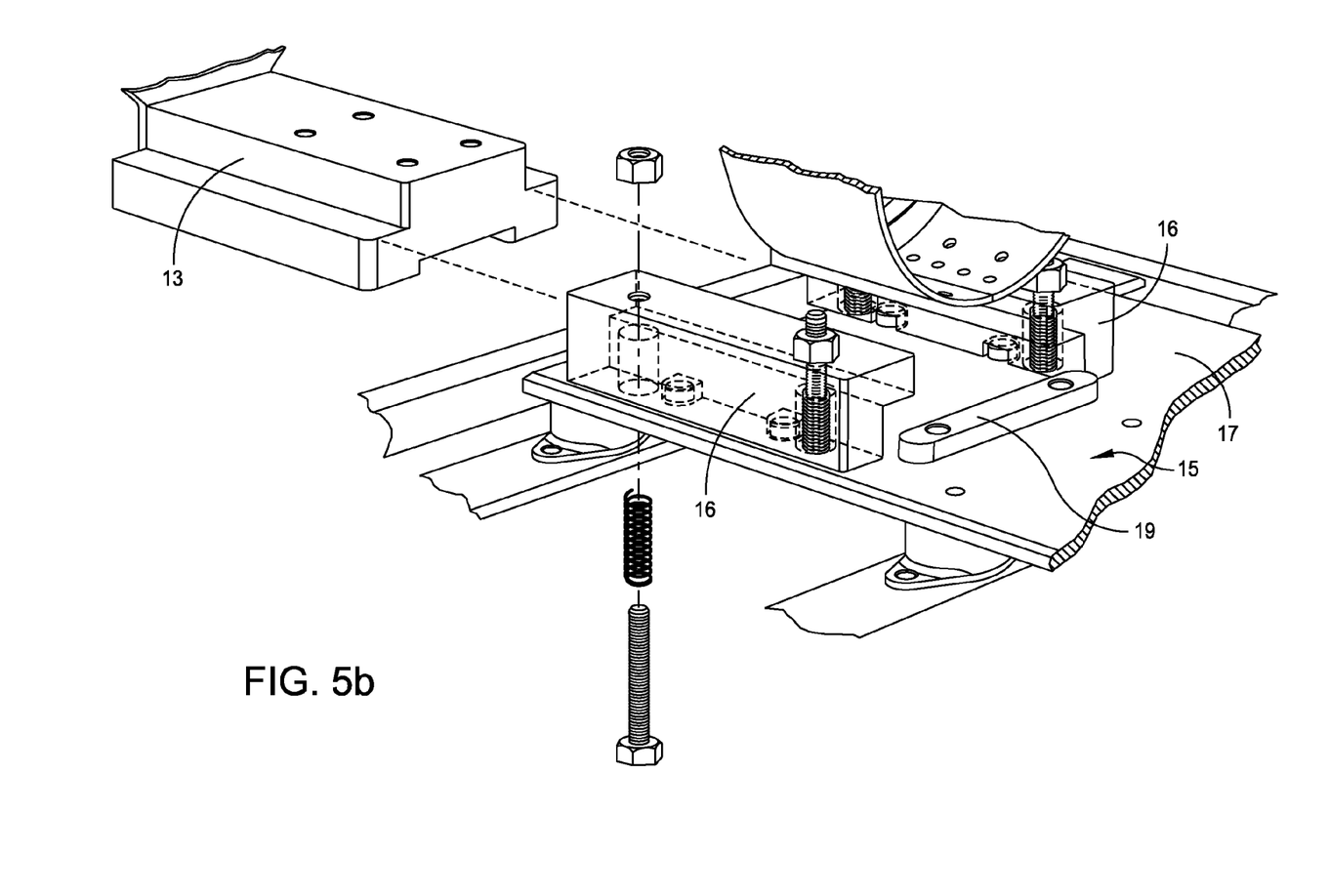
Figure 5C:
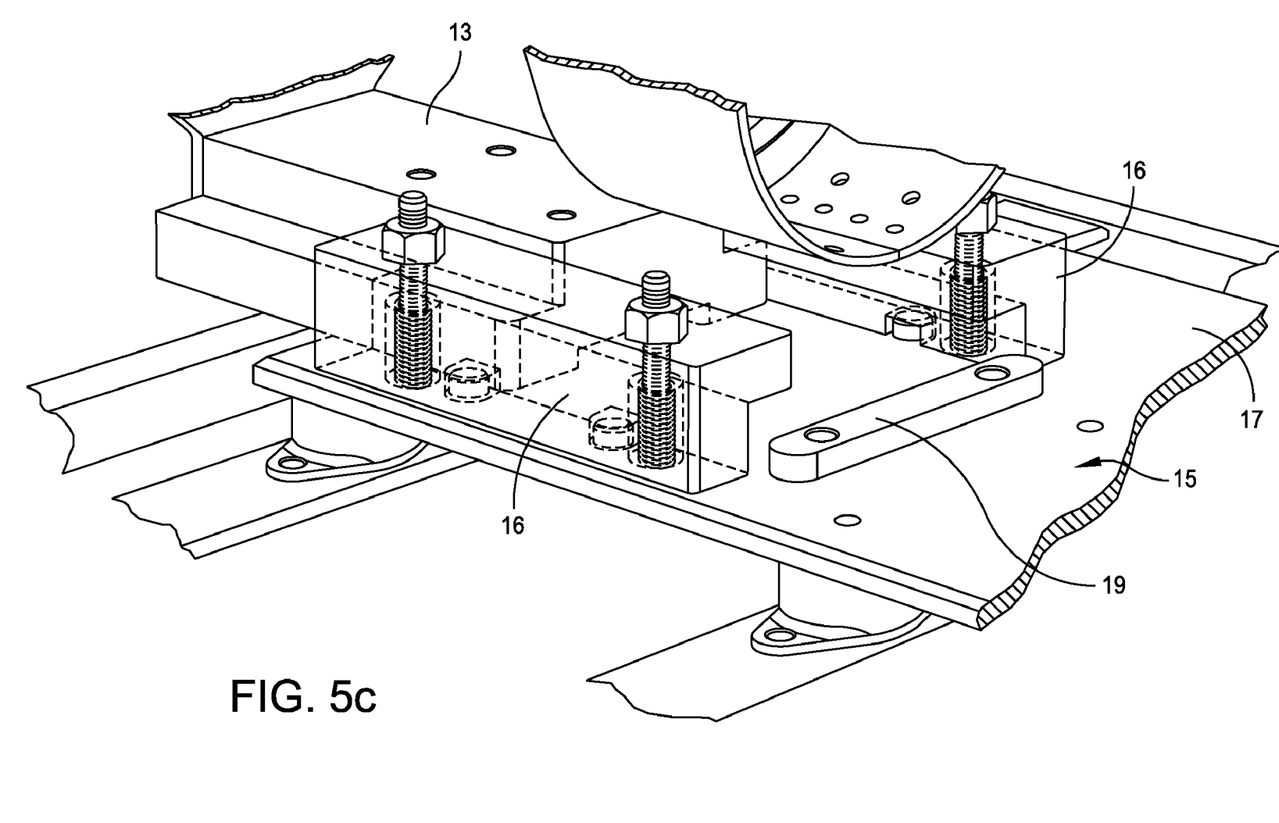
Figure 5D:
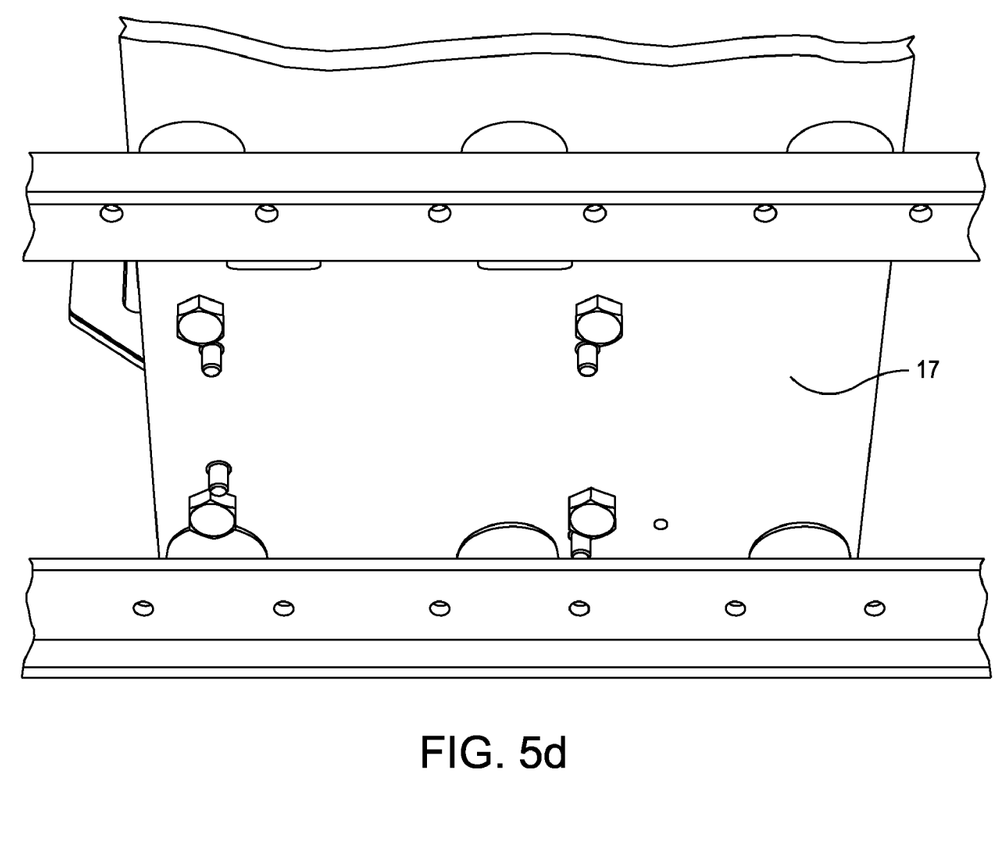

The shoe pad 13 can be bolted to the underside of the pump housing 31, for example through bolt holes in show pad 13 shown in FIG. 5b. In the embodiment of FIG. 5b, the clamping flanges 16 are biased by helical springs bearing away from base panel 17. The clamping bolts are received in counterbores and the springs reside around the bolts and bear between the top of the base plate 17 and the ends of the counterbores in the clamping flanges 16. When the bolts are loosened, the flanges are raised from plate 17, providing clearance to move the pump assembly 75, on shoe pad 13, into and out of position as shown in FIG. 5c. Tightening the bolts clamps the laterally protruding flanges of the shoe pad 13 against the base plate 17. The base panel 17 is bolted to the lower rails and cross members of the module frame 72 (see also FIGS. 6-8). Additional locating pins or stubs shown in FIG. 5d next to the bolt heads on the underside of panel 17 can be provided to better fix the lateral position of the clamping flanges 16 that overlie the lateral edges of shoe pad 13 when the pump is moved into operative position. The shoe pad 13 can be axially moved up to the stop 19 on the base panel 17. Alternatively, the axial placement position of the pump assembly 75 relative to the motor or engine 23 can be fixed by moving the pump assembly 75 in the direction of axial engagement of the shaft couplings on the pump shaft and motor or engine shaft respectively, until the shaft couplings bottom out. After the shoe pad 13 of the pump housing assembly 75 is in position, the shoe pad 13 is clamped down against the base panel 17 using bolts, thereby rigidly affixing the pump housing 31 and for driving by motor/engine 23 in an operational condition on the base panel 17.

FIGS. 3 and 4 illustrate that the pump assembly comprises two end plates 82 that are bolted on the axial ends of the pump housing 31, two longitudinal grip bars 83 that extend between and are bolted to the end plates, and one lateral grip bar 84 that is exposed on the fluid connection side of the pump housing. (See also FIG. 8, which shows the parts of the pump assembly with the pump itself omitted for purposes of illustration.) The lateral grip bar 84 can comprise a lateral member welded between end stubs with blind bores, receiving the bolts (not shown) that thread into threaded bores at the ends or the longitudinal grip bars. FIG. 3 additionally shows the shaft coupling 85 and a protective guard 87 that is preferably placed to enclose the axial zone occupied by the coupling 85 when mounted.

Figures 6, 7:
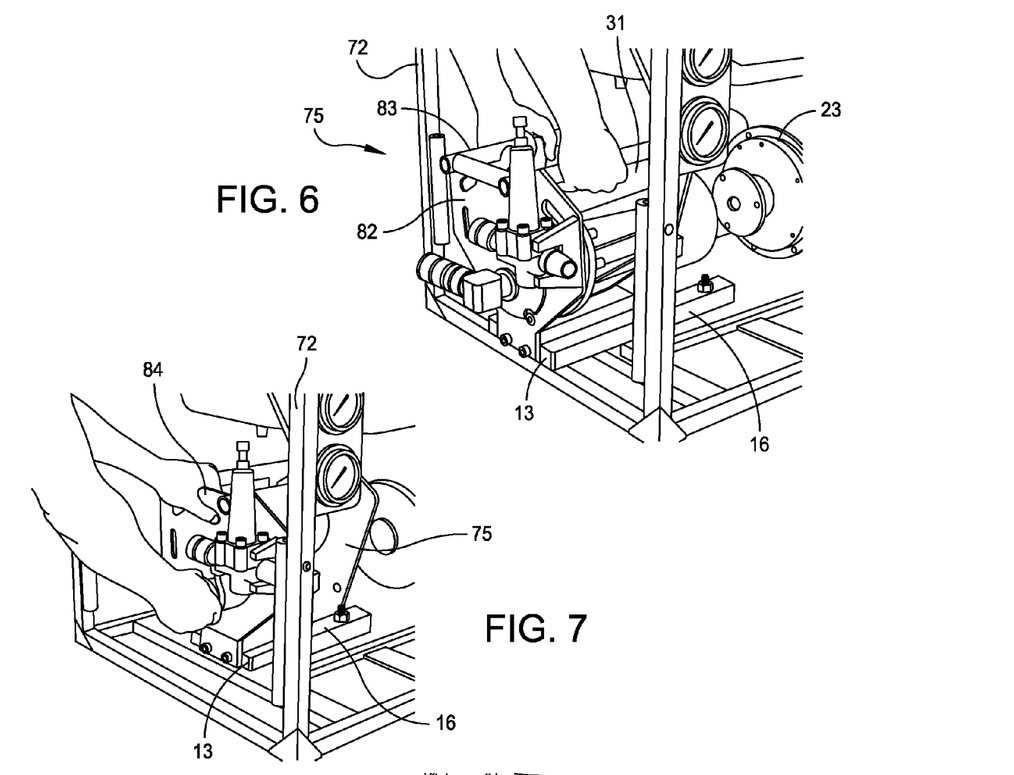
FIG. 6 is a perspective illustration showing the pump assembly and drive unit during a phase of assembly wherein the pump assembly is being manually moved into position or out of position.
FIG. 7 is a perspective illustration as in FIG. 6, with the pump assembly near its mounted position.

The pump assembly end plates 82 and grip bars 83, 84 provide places at which the pump housing can be grasped and manipulated by one or two people as shown in FIGS. 6 and 7. This is advantageous because the pump is relatively heavy (nominally 66 lbs or about 30 Kg). Moreover, the end plates 82 are bolted against and in thermally conductive contact with the pump housing 42. The end plates 82 provide exposed surfaces at which frictional heat developed by the pump can be dissipated by convection into the air. Normally, frictional heat energy developed by the pump is carried along with the flow of water through the pump. However, the heat dissipating endplates are advantageous in that the maximum temperature of the pump is limited by dissipation of heat energy. Potential thermal damage to the pump is limited or delayed in this way even if the pump should be run dry for a period of time.

The grip bars 83, 84 provided on the pump assembly as shown are coupled to the end plates 83 rather than directly to the pump housing 31. As a result, the grip bars remain cooler than the pump housing and the end plates. This arrangement enables one to grasp the pump assembly 75 by the grips and to manipulate the pump assembly while the pump housing is hot, i.e., without waiting for the pump housing to cool.

In the embodiment shown, the shoe member 13 forms a slide structure on the pump housing assembly 75 that is received in a clamping guide fixture on the base panel 17 between flanged bars 16. It should be appreciated that the gender relationship could be reversed, wherein a similar docking arrangement could be configured with a slide mounted by a standoff distance above the base panel 17, received in a slide clamping receptacle on the pump housing assembly 75. According to these embodiments, a slide shoe 13 is affixed relative to one of the module frame 72 or base panel 17 thereon and a housing 31 of the pump. A complementary guiding receptacle is affixed relative to the other of the module frame 72 and the housing 31 of the pump for receiving the slide. Accordingly, and as shown in FIGS. 6 and 7 it is possible to swing the pump housing assembly 75 into or out of position on the base plate 17 while grasping the longitudinal grip bars 83, to push or pull the pump housing assembly 75 in a direction parallel to the pump rotation axis by grasping the lateral grip bar 84, and generally to move the pump housing 31 into or out of its operative its end position in engagement with the motor/engine 23. When the pump is in its end position the pump housing assembly 75 is clamped or unclamped from attachment between the slide flanges 16 and the slide shoe 13 using a wrench as shown in FIG. 9.

Figure 8:
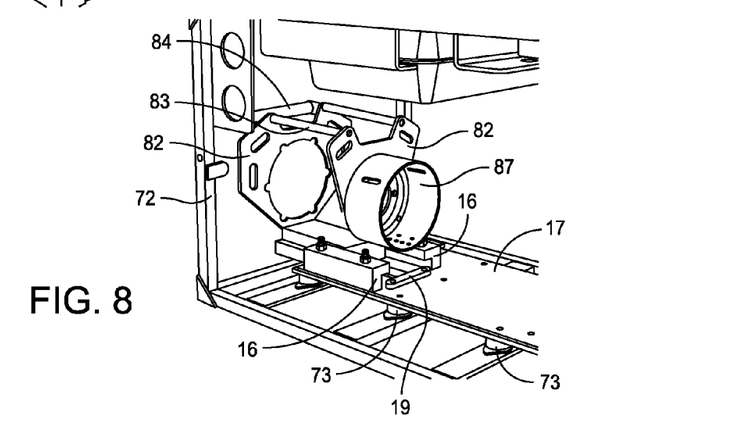
FIG. 8 is a partial perspective view showing the relationship between the chassis part of the pump assembly (without the pump housing itself) and the clamping slide receptacle on the base panel, and without the prime mover motor/engine being shown.
Figure 9:
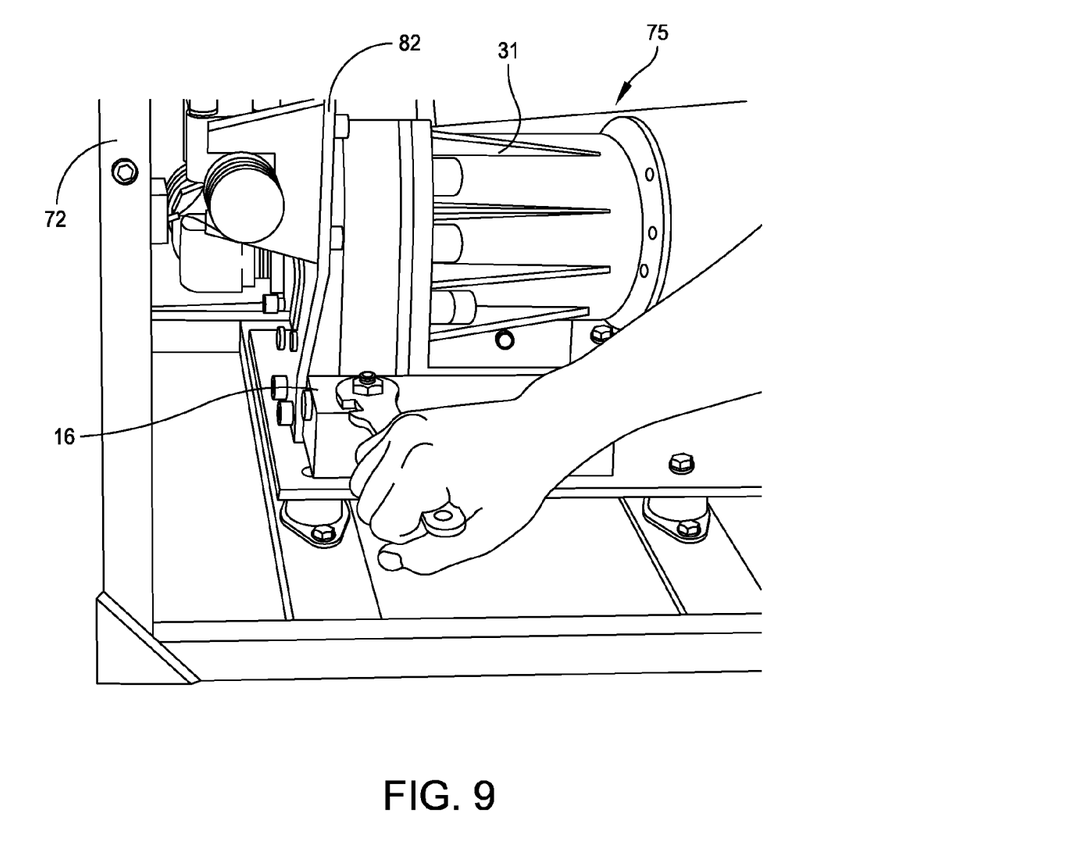
FIG. 9 is a partial perspective showing the pump assembly being clamped in position on the drive unit.
Figure 10:
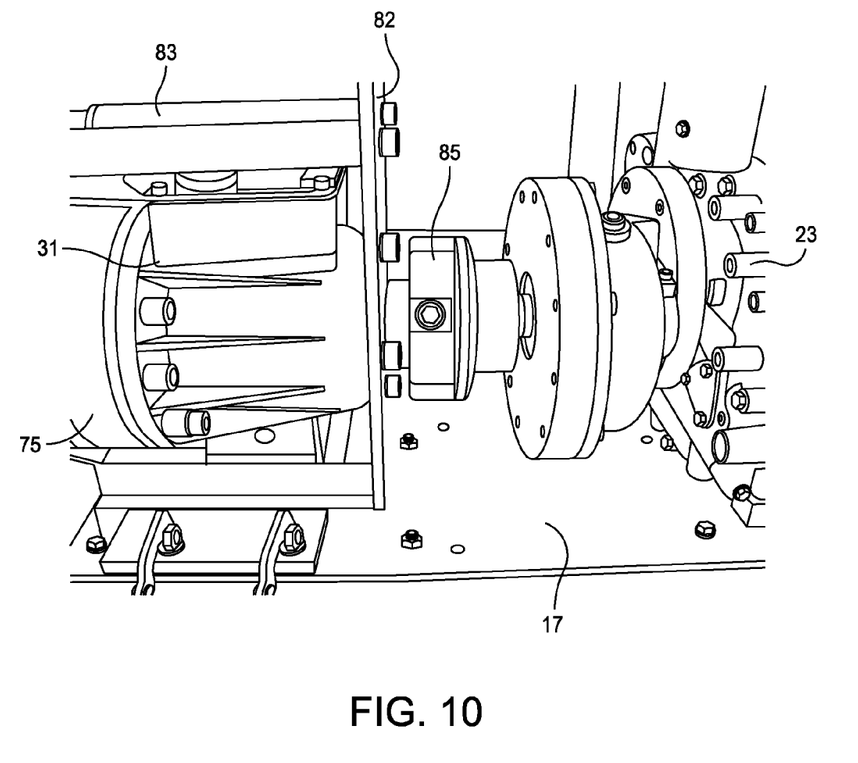
FIG. 10 is a perspective view showing an exemplary mechanical shaft coupling between the pump shaft and the driving shaft of the prime mover, illustrated for example as a diesel engine.

The clamping attachment aspects are further illustrated in FIGS. 8 and 9. In FIG. 8, the pump housing 31 is not shown to simplify the drawing; however the shoe 13 that is part of the pump housing assembly is seen sliding through the space between the receptacle flanges 16 up to the end stop 19 that fixes the axial end position of the pump assembly 75. Bolts are provided to tighten the receptacle flanges 16 down over the shoe 13 and clamp the shoe against the mounting panel 17. For ease of insertion of the shoe 13 when installing the pump housing assembly 75, helical compression springs can be provided on the shafts of the bolts to reside in counter bores in the flange bars, and urge the receptacle flanges 16 upward from the base panel to the extent permitted by the bolts, and thereby to open space for the shoe 13. The bolts are tightened down as shown in FIG. 9, thereby compressing the springs as the receptacle flanges 16 are clamped down onto the 13 shoe and rigidly clamp the pump housing assembly 75 to the base panel 17. In this way, the pump is held in position at which the shaft coupling 85 between the pump shaft and the motor/engine shaft is engaged as shown in FIG. 10. The process is reversed by loosening the bolts (but not detaching the bolts entirely), whereupon on the compression springs raise the clamping receptacle flanges 16. The pump assembly is then withdrawn in a direction parallel to the pump rotation axis, thus decoupling the fitting that rotationally engages the pump shaft with the motor/engine shaft.

Accordingly, in the illustrated arrangements as described, the pump of a water purification system has a pump housing with a rotatable pump shaft, and further comprises a pump assembly containing the pump housing, including at least a base mounting for removably and interchangeably mounting the pump to one or another of the prime mover modules carrying a motor or engine or other prime mover. The base mounting as described can comprise comprises a slide affixed to one of the module and the pump assembly and a guiding receptacle affixed to the other of the module and the pump assembly, for receiving the slide. Preferably the slide is on the pump housing and the receptacle is on a base plate attached to the frame of the prime mover module.

The pump assembly comprises at least one pump end plate attached to the housing of the pump, and at least one elongated bar extending from the pump end plate on a side of the pump opposite from the base mounting and at a space from the base plate, forming a handle for manipulating the pump assembly. Preferably, the a pump assembly chassis is formed by two pump end plates affixed to opposite ends of the pump housing, in thermally conductive contact with the pump housing, and at least one elongated bar extending between the pump end plates on a side of the pump opposite from the base mounting and at a space from the base mounting plate on the motor/engine model frame, forming a handle for manipulating the pump assembly. The handle is thermally conductively spaced from the pump housing at least by the pump end plate.

As shown in FIG. 4, the pump shaft extends through one of the endplates and carries a rotational coupling that mates with the drive shaft a respective one of the motor and engine. The motor/engine preferably is permanently mounted to the base plate that carries the docking slide for the shoe of the pump. Alternatively, the motor/engine can also be a removable element that can be replaced with a prime mover of the same type or of a different type.

Referring again to FIGS. 1 and 2, the water purification system includes a number of rectilinear frames forming functional modules, each of the frames carrying elements of the water purification system for coupling in series and parallel relations using hoses or other flow conduits that are preferably readily attachable with quick connect fittings. At least two of the frames respectively carrying one or more water filtration elements of different types, and at least one of the frames is a prime mover module carrying a motor or engine for driving the mountable and de-mountable water pump. FIG. 2 shows that the frames advantageously are relatively sized to stack atop and in abutment with one another such that a set of the frames forming an operable system for purification of water fully occupies a rectilinear volume for one of shipment and storage.

Advantageously, individual ones of the frames respectively carry functional water purification elements including at least one low pressure pump, a solids separation element, a chemical filtration element, a high pressure pump prime mover, and a reverse osmosis filtration element. The system is shipped on a pallet complementary to the rectilinear stack of frames, as shown in FIG. 2. Inasmuch as the water pump is configured for selective operational mounting and demounting in a selected one of at least two prime mover modules, the option is presented to ship two prime mover frames that are structured alternatively to receive and operate a pump that is mounted in one of them. Alternatively, the prime mover frames, which are externally the same size, are selectively shipped, one or the other, to a particular site of deployment.

The invention has been described and disclosed with respect to certain embodiments that are presented as nonlimiting examples. The invention is not limited to the embodiments disclosed as examples. Reference should be made to the appended claims rather than the disclosure of exemplary embodiments, to determine the scope of the invention in which exclusive rights are claimed.

What is claimed is:

1. A water purification system, comprising:
  a plurality of modules connectable by water flow conduits, the modules carrying at least one water filtration element, and at least one water pump coupled by the conduits to the water filtration element;
  an electric motor and an internal combustion engine;
  wherein the modules include a filtration module and at least two pump drive modules, wherein the at least two pump drive modules includes one module carrying the electric motor and another module carrying the internal combustion engine;
  wherein the water pump is configured for selective coupling to one of the electric motor and the internal combustion engine by engaging the water pump with one of the pump drive module carrying the electric motor and the pump drive module carrying the internal combustion engine, whereby said motor and said engine are structured to alternatively couple with and power the pump.

2. The water purification system of claim 1, wherein the at least two pump drive modules including the module carrying the electric motor and the module carrying the internal combustion engine each comprises a permanent mounting for a respective one of said motor and engine and a detachable mounting for the pump, whereby the pump is alternatively and interchangeably driven by one of the motor and the engine by installing the pump in the detachable mounting of the module carrying the respective one of said motor and engine.

3. The water purification system of claim 2, wherein said one of the motor and engine as fixed by the permanent mounting comprises a rotational drive shaft and wherein the pump comprises a rotationally driven pump shaft coupleable along a drive train to the drive shaft.

4. The water purification system of claim 3, further comprising a gear reduction unit in the drive train between the drive shaft and the pump shaft.

5. The water purification system of claim 3, further comprising a coupling along the drive train between the drive shaft and the pump shaft, the coupling being affixable for rotation with one of the drive shaft and the pump shaft, and wherein the coupling is engaged and disengaged by manual displacement along a longitudinal axis.

6. The water purification system of claim 5, further comprising a base mounting for removably and interchangeably mounting the pump to either of said pump drive modules carrying the motor and the engine, respectively, wherein the base mounting comprises a slide affixed to one of the module and a housing of the pump, and a guiding receptacle affixed to an other of the module and the housing of the pump for receiving the slide.

7. The water purification system of claim 6, further comprising at least one clamp operable mechanically to fix the slide to the base mounting at a position wherein the coupling is engaged.

8. The water purification system of claim 2, wherein the pump comprises a pump housing and a rotatable pump shaft, and further comprising a pump assembly including the pump housing, the pump assembly comprising a base mounting for removably and interchangeably mounting the pump to either of said pump drive modules carrying the motor and the engine, respectively, wherein the base mounting comprises a slide affixed to one of the module and the pump assembly and a guiding receptacle affixed to an other of the module and the pump assembly, for receiving the slide.

9. The water purification system of claim 8, wherein the pump assembly comprises at least one pump end plate attached to the housing of the pump, and at least one elongated bar extending from the pump end plate on a side of the pump opposite from the base mounting and at a space from the base plate, forming a handle for manipulating the pump assembly as a unit.

10. The water purification system of claim 8, wherein the pump assembly comprises two pump end plates attached on opposite sides to the housing of the pump, and at least one elongated bar extending between the pump end plates on a side of the pump opposite from the base mounting and at a space from the base plate, forming a handle for manipulating the pump assembly as a unit.

11. The water purification system of claim 10, wherein the pump shaft extends through one of the endplates and carried a rotational coupling that mates with the drive shaft of a respective one of the motor and engine.

12. The water purification system of claim 11, comprising at least one fitting mounted on one of the endplates that is opposite from the rotational coupling, for coupling a water conduit to the pump.

13. The water purification system of claim 11, wherein the chassis comprises spaced pump endplates attached to one another on one side of the pump by the base mounting provided for attachment to one of the modules of the respective motor and engine, the endplates being attached to one another on a side of the pump opposite from the base mounting by two spaced elongated bars forming handles for manipulating the pump during mounting and demounting from said modules.

14. The water purification system of claim 2, wherein the filtration element comprises a reverse osmosis filter membrane and the pump comprises a high pressure pump developing an operational pressure for maintaining a flow through the membrane.

15. The water purification system of claim 1, wherein the modules comprise rectilinear frames, each of the frames carrying functional water purification elements and at least two of the frames respectively carrying said at least one water filtration element and said at least one water pump, wherein the frames are relatively sized to stack atop and in abutment with one another such that a set of the frames forming an operable system for purification of water fully occupies a rectilinear volume for one of shipment and storage.

16. A water purification system, comprising, in combination:
a plurality of modules connectable by water flow conduits, the modules carrying at least one water filtration element, and at least one water pump coupled by the conduits to the water filtration element, wherein the modules include a filtration module carrying the filtration element and a pump module carrying the water pump;
a first rotational drive unit connected to an electric motor;
a second rotational drive unit connected to an internal combustion engine;
wherein the water pump comprises a rotational drive coupling configured to engage interchangeably with a selected one of said first and second rotational drive units, each of said first and second rotational drive units having a coupling complementary to the rotational drive coupling of the water pump.

* * * * *